3,009,857
METHOD OF GROWTH IMPROVEMENT IN MEAT PRODUCING ANIMALS
Francis X. Gassner, Fort Collins, Colo., assignor to Olin Mathieson Chemical Corporation, a corporation of Virginia
No Drawing. Filed Dec. 31, 1956, Ser. No. 631,446
2 Claims. (Cl. 167—53)

The present invention relates to the improvement of meat production in meat producing animals such as steers, heifers, calves, sheep (lambs) and other domestic food animals.

The addition of small amounts of an estrogenic substance such as diethylstilbestrol to rations for feed-lot cattle for the purpose of enhancing growth and fattening is known. See the copending application of Gassner et al., Serial No. 585,410, filed May 17, 1956, and Turner et al. Patent 2,541,447 and Burroughs Patent 2,751,303. The administration of diethylstilbestrol for like purposes in the poultry field by injection of a suspension of crystalline diethylstilbestrol in a plasticized high molecular weight polymerized polyethylene glycol carrier of the "Carbowax" type is also known. See Moore et al. Patent 2,681,297.

The administration of an estrogenic substance such as diethylstilbestrol has been practiced successfully commercially although the addition of diethylstilbestrol as such to food rations has proven objectionable (1) due to the weight and bulk of the concentrate premix resulting in relatively high freight charges and storage overhead and (2) due to the difficulties encountered in mixing the premix with the ration supplied to the feeders. These difficulties include problems involved in obtaining a uniform product, danger to operators caused by inhaling hormone containing dusts, etc. See the Gassner et al. application, supra, and the improved compositions described therein for overcoming for the most part these and other objections. The search, however, for improved stable compositions, particularly compositions which could be injected, has continued as this type of composition has little bulk and presents no storage or complicated mixing problems.

During my research investigations in this field, I investigated the administration in pellet form of individual androgenic hormones including testosterone, testosterone propionate, delta-4-androstenedione, pregnenolone, and estrogenic hormones including estradiol, estradiol benzoate and estradiol propionate and dipropionate, as a single implant. The results of these tests using relatively expensive hormones indicated that while weight gain was obtained the inferior quality of the carcass and the high rate of feed consumption to obtain this gain made this procedure economically unsound.

At this time, it appeared that the best approach might be by the administration by injection of a relatively inexpensive estrogenic substance such as diethylstilbestrol. This procedure, however, was found to produce "feminization" with resulting undesirable or adverse side reactions. The principal undesirable actions in cattle which deleteriously affect the quality of the carcass are the unequal placement of fat, primarily in the rear quarters and on the abdominal viscera, and the relaxation of the pelvic ligaments, primarily sacro-sciatic, resulting in an abnormal elevation of the tail-head (sacrum and coccygeal vertebra). Attempts to eliminate these feminizing changes after they have been produced, by subsequent injection of androgen, were unsuccessful.

In continued research investigation, I discovered that when the estrogen was mixed with proper amounts of androgen at the time of injection or implantation, the undesirable anatomical changes referred to above did not occur. I also discovered that when the combination of androgen and estrogen was used the treated animals showed a substantial daily gain in weight over the untreated animals while at the same time consuming less or at least no more feed than the untreated animals. This last result was the exact reverse of my prior work in this field where the administration of a single hormone always seemed to be associated with higher feed consumption. The combined proteogenic and lipogenic effects produced, respectively, by the androgen and estrogen, involves augmentation as the daily gain produced by the combination is greater than the sum of daily gains produced individually by the same amounts of androgen and estrogen.

To obtain the desired results described above, I have found that the androgen must be in excess of the estrogen and that for androgens with the activity of testosterone and estrogens with the activity of diethylstilbestrol, that the ratio of androgen to estrogen in parts by weight should be at least 4 to 1 and preferably 5 to 1. Larger ratios of androgen to estrogen can be used but are ordinarily not accompanied by any substantial additional beneficial results (except for calves) over and above the 5 to 1 ratio which has been found adequate to prevent the undesirable feminization changes produced by the estrogen. For calves an androgen to estrogen ratio of about 10 to 1 is preferred. For a beef steer or heifer the injection of at least about 60 mg. up to about 240 mg. of androgen has proven satisfactory with about 120 mg. androgen such as testosterone per dosage unit being preferred. For smaller animals the amounts should be reduced, e.g. for a calf the androgen injected should preferably fall within the range of about 50–100 mg. with an androgen to estrogen ratio of about 10 to 1, and for a lamb the androgen injected should preferably fall within the range of about 24–50 mg. with an androgen to estrogen ratio of about 5 to 1. Larger amounts or smaller amounts with multiple doses can be employed although for a single injection the ranges of androgen specified above in combination with the specified ratios of estrogen are preferred. Except for lambs where the treatment is ordinarily for a relatively short time and involves only one shot or injection, multiple injections of the type described above can be employed to increase weight gains in steers, heifers and calves.

The following representative examples will serve to illustrate the invention.

ANDROGEN+ESTROGEN

| | Mg./Injection | |
|---|---|---|
| | 0.4 cc. | 0.8 cc. |
| Example I: | | |
| Testosterone | 60 | 12 |
| Diethylstilbestrol | 12 | 2 |
| Example II: | | |
| Testosterone | 120 | 24 |
| Diethylstilbestrol | 24 | 4 |
| Example III: | | |
| Testosterone | 60 | 12 |
| Polystilbestrol phosphate | 15 | 3 |
| Example IV: | | |
| Testosterone | 60 | 12 |
| Estradiol | 12 | 2 |
| Example V: | | |
| Testosterone | 60 | 12 |
| Estradiol valerate | 12 | 2 |
| Example VI: | | |
| Testosterone | 60 | 12 |
| Estradiol undecylate | 12 | 2 |
| Example VII: | | |
| Testosterone enanthate | 60 | 12 |
| Diethylstilbestrol | 12 | 2 |
| Example VIII: | | |
| Testosterone enanthate | 30–60–120 | 60–120–24 |
| Estradiol valerate | 6–12–24 | 12–24–4 |
| Example IX: | | |
| Testosterone enanthate | 60 | 12 |
| Estradiol undecylate | 12 | 2 |

WITH ANTI-THYROID AGENT

|  | Mg./injection | |
|---|---|---|
|  | 0.4 cc. | 0.8 cc. |
| Sample X: | | |
| Testosterone | 60 | 120 |
| Diethylstilbestrol | 12 | 24 |
| Methimazole | 12 | 24 |
| Sample XI: | | |
| Testosterone | ---------- | 120 |
| Estradiol valerate | ---------- | 24 |
| Methimazole | ---------- | 24 |
| Sample XII: | | |
| Testosterone enanthate | 60 | 120 |
| Estradiol valerate | 12 | 24 |
| Methimazole | 6 | 12 |

|  | 0.4 or 0.8 cc. |
|---|---|
| Sample XIII: | |
| Testosterone | 50-80-100 |
| Diethylstilbestrol | 5-8-10 |
| Sample XIV: | |
| Testosterone | 24-30-50 |
| Diethylstilbestrol | 4-6-10 |

ANDROGEN+ESTROGEN+PROGESTATIONAL

|  | 0.4 cc. | 0.8 cc. |
|---|---|---|
| Sample XV: | | |
| Testosterone enanthate | 15-30-60 | 30-60-120 |
| Estradiol valerate | 6-12-24 | 12-24-48 |
| alpha-hydroxyprogesterone caproate | 15-30-60 | 30-60-120 |

In the above examples the compositions of Examples XII are in the dosage units preferred for steers and heifers, the compositions of Example XIII are in the dosage units preferred for calves and the compositions of Example XIV are in dosage units preferred for lambs. Where at least two doses are to be injected one-half of the minimum dose can be employed, e.g. 30 mg. of androgen and 6 mg. of estrone (see first composition of Example VIII) can be employed for steers and heifers. As shown in Examples X–XII an anti-thyroid agent can also be employed if desired.

In Example XV one-half of the androgen is replaced by 7-alpha-hydroxyprogesterone caproate. While the 17-alpha-hydroxyprogesterone is biologically inert, the caproate can be used to advantage in the androgen-estrogen combination as it is an active anabolic agent with some androgenic properties. This composition is one of the preferred for steers while the composition of Example I is preferred for heifers.

In over eighty experiments with over twenty-six thousand (26,000) animals, I have found the injection of the compositions described above to provide increase in weight much more rapidly along with a marketable "finish" in a much shorter time than control animals fed the same rations without the injection of the hormone combinations. These factors give the rancher more meat with less feed. In these experiments I also found that the treated animals were substantially free from (a) feminization, i.e. unequal distribution of fat along with high tail heads, and (b) masculinization or stagginess, i.e. narrow rear quarters with big necks. The absence of these undesirable features given the rancher increased carcass quality, yielding both more dressed meat per carcass and more meat of higher grade, i.e. more prime and choice cuts.

The ingredients in the above examples can be mixed with inert pharmaceutical diluents and carriers of the type employed for injectable preparations in accordance with standard practices in the art. Ordinarily the concentrations are such that the amounts specified in the examples can be administered by injection of about 0.5 to 1.0 cc., the 0.4 cc. and 0.8 cc. doses illustrated in the examples being within the preferred range. The preferred carriers are in injectable paste form and carry the active hormone ingredients in solution form dispersed therein. One of the preferred carriers comprises a mixture of polymerized polyethylene glycols containing about 1.5–2.0 parts by weight of liquid polymerized polyethylene glycol of a molecular weight of about 200–300 to 1 part by weight of solid polymerized polyethylene glycol of a molecular weight of about 4000. These materials are available on the open market as polyethylene glycol 200 or 300 and polyethylene glycol 4000 (Carbowax). See McClelland et al., Chem. Eng. News 23, 247 (1945).

The following examples will serve to further illustrate the invention.

Example XVI

|  | Grams |
|---|---|
| Testosterone | 60 |
| Diethylstilbestrol | 12 |
| Polyethylene glycol 200 | 256 |
| Polyethylene glycol 4000 | 172 |

Mix the testosterone and diethylstilbestrol with the polyethylene glycol 200 and heat the mixture to about 65–70° C. with continued slow agitation until in solution. Add the polyethylene glycol 4000 (Carbowax) to the resulting solution with mixing and the temperature maintained at about 65–70° C. until all ingredients are in solution. (Filter if necessary to remove any undissolved material.) Raise the temperature of the resulting solution to about 80–85° C. and pour the hot mixture into extrusion ampules of the injectable cartridge type. The cartridges should then be placed in a water bath at a temperature of about 70–75° C. and the mixture allowed to stand until congealed. The paste composition prepared as above can be employed for 500 injections of about 1 gram each containing 120 mg. of testosterone and 24 mg. of diethylstilbestrol per injection, and can be administered in a multiple shot dispensing gun of the type described in Moore et al. Patent 2,624,338.

Example XVII

|  | Grams |
|---|---|
| Testosterone enanthate | 23 |
| Estradiol valerate | 4.6 |
| Methimazole | 2.3 |
| Polyethylene glycol 200 | 95.6 |
| Polyethylene glycol 4000 | 63.5 |

The active hormone ingredients are mixed with the polyethylene glycols as described in the above Example XVI and the methimazole added to the heated mixture after addition and solution of the high molecular weight polyethylene glycol 4000. The composition is then poured immediately into injection cartridges as described in the above example. This composition provides for about 190 0.8 cc. injections containing about 120 mg. of testosterone enanthate, 24 mg. of estradiol valerate and 12 mg. of methimazole per injection.

In the improved paste type compositions described above the low molecular weight polyethylene glycol acts both as a plasticizer and also as a solvent for the active ingredients which are dispersed in solution form throughout the high molecular weight polyethylene glycol. When the composition is injected and comes in contact with body fluids the active ingredients crystallize and are precipitated as a uniform mixture in situ. Where mixtures are employed as in the present invention, the carrying of the ingredients in solution form rather than as a suspension prior to injection is important for overall uniformity of product. The compositions have also been found to be stable and to retain the desired characteristics during storage.

The results of one of the experiments referred to above is illustrated in Table I below.

TABLE I

|  | Control | Treated |
|---|---|---|
| Number of steers | 218 | 66. |
| Number of days fed | 80 | 65. |
| Average daily gain (lbs.) in feed lot | 2.56 | 3.2. |
| Carcass yield (percent) | 62.8 [1] | 63.3. |
| Grade |  | 40% prime. |
|  | 25% prime [1] | 60% choice. |
|  | 75% choice |  |

[1] Carcass yield and grade on 44 of the best of the 218 control steers.

The treated steers in this table received one injection containing 120 mg. of testosterone and 24 mg. of diethylstilbestrol. As shown in the table the treated steers had an average daily gain in the feed lot of over 0.5 pound more than the controls and reached a marketable finish in 65 days compared to 80 days for the controls. The yield of dressed meat per carcass as well as the grade of meat obtained were also better for the treated steers than for the controls.

The androgen-estrogen injectable compositions of the present invention can also be combined to advantage, if desired, with the oral feeding of diethylstilbestrol as shown in Table II below.

TABLE II

|  | Control | Treated |
|---|---|---|
| Number of steers | 105 | 105. |
| Number days fed | 62 | 58. |
| Initial weight (lbs.) | 839 | 843. |
| Final weight (lbs.) | 1,025 | 1,036. |
| Daily gain in feed lot (lbs.) | 3.0 | 3.3. |
| Carcass dressing yield (percent) | 59.57 | 62.07. |
| Grade |  | 100% choice. |
|  | 90% choice |  |
|  | 10% good |  |

In this experiment all of the steers (Controls and Treated) were fed the U.S. Government (FDA) approved daily ration containing 10 mg. of diethylstilbestrol, and the treated animals, in addition, were also injected with a mixture of 120 mg. of testosterone and 24 mg. of diethylstilbestrol prepared as described in Example XVI. As shown in the table the treated steers had an average daily increase gain above the controls and reached a marketable finish a few days before the controls. The advantages of the androgen-estrogen injection are also clearly demonstrated by the increased carcass dressing yield of about 2.5% together with the improved grade of meat for the treated steers compared to the controls.

In the above examples where the androgen is free testosterone and the estrogen is diethylstilbestrol (see Examples I and II), the compositions are relatively short in action and a single injection of the preferred amounts in the preferred ratio ordinarily remains active in the animal body for only about 30–45 days. Where longer activity is desired, e.g. up to and past 60 days, the long acting esterified steroids, e.g. steroids esterified with a fatty acid containing 4 to 12 carbon atoms, can be used. (See Examples VIII and IX.) The following additional examples are illustrative of the longer acting compositions.

Example XVIII:      Mg./injection in 0.4 cc. or 0.8 cc.
    Testerone-caprylate _____ 120
    Estradiol-3,17-di-n-butyrate _____ 24

Example XIX:
    Testosterone-caprylate _____ 60
    17-alpha-hydroxyprogesterone enanthate___ 60
    Estradiol-3,17-di-n-butyrate _____ 24

In Examples XVIII and XIX, as well as the other composition examples described above, the active ingredients are uniformly dispersed in an injectable pharmaceutical carrier, preferably dissolved in a carrier such as the liquid and solid polymerized polyethylene glycols described above, sufficient carrier being used to provide a single dosage unit of about 0.5 to about 1.0 cc. The preferred dose (120 mg. androgen and 24 mg. estrogen), for example, can be administered as shown in Examples XVIII and XIX in a dosage unit of about 0.4 cc. as well as 0.8 cc. In Example XIX the anabolic (nitrogen retention) agent 17-alpha-hydroxy-progesterone caproate of Example XV has been replaced by oxyprogesterone enanthate. As shown in these examples the ratio of androgen plus anabolic agent to estrogen is maintained at about 5 to 1 (the preferred overall ratio for androgen to estrogen), with a single dosage unit of 120 mg. (60 mg. androgen+60 mg. anabolic agent) with 24 mg. of estrogen. In addition to the active hormones disclosed, other derivatives and compounds characterized by androgenic activity and estrogenic activity (with or without an anabolic agent, anti-thyroid agent, etc.) can be employed in the present invention. The compositions are injected or implanted under the skin in accordance with general practices in the art. Administration subcutaneously in the submaxillary region or preferably in the base of one of the ears are examples.

I claim:
1. The method of growing and fattening meat producing animals selected from the group consisting of steers and heifers which comprises subcutaneously injecting into said animals a mixture consisting essentially of about 120 mg. of testosterone and about 24 mg. of diethylstilbestrol uniformly dispersed in an injectable pharmaceutical carrier.

2. The method of growing and fattening meat producing animals selected from the group consisting of steers and heifers which comprises subcutaneously injecting into said animals a mixture consisting essentially of about 60 mg. of 17-alpha-hydroxyprogesterone caproate, about 60 mg. of testosterone enanthate and about 24 mg. of estradiol valerate uniformly dispersed in an injectable pharmaceutical carrier.

References Cited in the file of this patent

UNITED STATES PATENTS 2,681,297    Moore _____ June 15, 1954
2,753,360    Kasper _____ July 3, 1956

FOREIGN PATENTS 636,908    Great Britain _____ May 10, 1950

OTHER REFERENCES

Beeson: Mimeo A. H. 148, Purdue Univ. Agri. Exp. Stat. April 29, 1955 (3 pp.) (99–2H).

O'Mary: J. of Animal Science, vol. II, 1952, pp. 656–673 (particularly pp. 656–658, 668–673).

Modern Drug Encycl., 5th Ed., 1952, p. 315.

Jordon: J. Animal Science, vol. 15, No. 4, Nov. 1956 pp. 1003–1007.